United States Patent [19]

Kenmochi

[11] Patent Number: 5,275,864

[45] Date of Patent: Jan. 4, 1994

[54] SURFACE-INDENTED COVERING MEMBER

[75] Inventor: Kazuei Kenmochi, Osaka, Japan

[73] Assignee: Matsushita Electric Industrial Co., Ltd., Osaka, Japan

[21] Appl. No.: 666,663

[22] Filed: Mar. 8, 1991

[30] Foreign Application Priority Data

Mar. 12, 1990 [JP] Japan .................................. 2-60182

[51] Int. Cl.$^5$ ............................................. B32B 3/00
[52] U.S. Cl. ...................... 428/156; 428/68; 428/141; 428/142; 428/161; 428/163; 428/167; 428/172; 428/212; 428/332
[58] Field of Search ............ 428/156, 161, 163, 167, 428/172, 68, 141, 142, 212, 220, 332

[56] References Cited

U.S. PATENT DOCUMENTS 3,222,697 12/1965 Scheermesser ...................... 428/167

Primary Examiner—Donald J. Loney
Attorney, Agent, or Firm—Wenderoth, Lind & Ponack

[57] ABSTRACT

A covering device includes a surface-indented covering member with at least one groove formed in its surface. The at least one groove has a depth in the range of 0.2 to 0.4 microns and a width which is not more than the depth thereof and is greater than 0 and not more than 0.4 microns. Another covering device includes a surface-indented covering member with a groove formed in its surface, and a covering material disposed on the surface of the member to cover at least the groove thereunder. The depth of the groove is in a range from 0.12 to 0.3 microns, and the width thereof is not more than the depth and is greater than 0 and not more than 0.3 microns. The covering material is transparent and has a refractive index smaller than that of the covering member.

5 Claims, 1 Drawing Sheet

Fig. 3 - PRIOR ART

SURFACE-INDENTED COVERING MEMBER

BACKGROUND OF THE INVENTION

The present invention relates to a surface-indented covering member having irregularities on its surface forming the outer side of an instrument, an appliance, and parts, which are industrially manufactured, such as television, radio, tape recorder, compact disk player, optical disk player, video tape recorder, camera, video camera, cleaner, washing machine, refrigerator, toaster, juicer, mixer, electric iron, air conditioner, personal computer, word processor, floppy disk driver, hard disk driver, telephone, wireless appliance, interphone, speaker, laser beam printer, PPC, facsimile, battery, capacitor, magnetic tape cassette, motor, actuator, encoder, bicycle, motorbicycle, car, heating appliance, microwave oven, electric fan, clock, illuminating instrument, and toy. More particularly, the present invention relates to the surface-indented covering member which improves the value of a commodity by making the color tone of the surface thereof aesthetically pleasing.

The term surface-indented covering member refers to body, a case, a sheath, a housing, a box, or a panel. The surface-indented covering member is provided on the surface of instruments, appliances, and parts which are industrially manufactured in order to protect the function thereof, improve the safety thereof and give them a pleasing appearance.

In order to make a product aesthetically pleasing, manufacturers consider the following three elements in producing a surface-indented covering member so that the product has a pleasant texture such as soft or hard, rich, functional, aesthetically beautiful, and fresh: the entire outline configuration of the product; the three-dimensional configuration which is determined by the arrangement of a button, knob, lever, dial, or the like; and a color design determined by color, brightness, and gloss.

According to a technique used as a means for giving a favorable color to a product, natural materials such as wood, stone, and fur are cut, ground, or connected with each other to use them as surface-indented covering members without degrading the appearance thereof. But these natural materials are expensive and used for limited products, for example, high class products.

Generally, industrial products are coated with surface-indented covering members composed mainly of a metal plate such as of iron or aluminum; a plastic molding; or a plastic sheet. Depending on the product, glass, cloth, or paper may additionally be used. The following techniques are used to manufacture surface-indented covering members: The surface of iron, aluminum, and plastic molding is smoothed; rough irregularities are formed on the surface thereof (which is called an embossing process); a hairline process is used; particles such as pigment are dispersed in the material of the member; a resin which contains dye or pigment is applied to the surface of the main body; and metal powders are contained in the plastic molding so as to make customers feel as if the product were made of metal. Parts produced as above are combined with each other so as to adhere or engage a combined material to the main body, or such that it can be pressed onto the main body by hot-stamping or welding.

These techniques depend on a material or an additive such as a dye or pigment to function for selectively reflecting light of a specific wavelength from among light of various wavelengths, which has been incident on the surface of the surface-indented covering member. According to these techniques, light quantity and direction of light which has been incident on the surface of the surface-indented covering member and reflected thereby are determined by the degree of roughness of the product surface of the member.

However, in consideration of the spectral characteristic of absorption/reflection in the visible region, there are few materials which reflect a specific wavelength. Therefore, colors of the surface-indented covering member look dull. Particularly, blue and green are perceived to be dull.

As such, light quantity and direction of reflected light are not as favorable as intended because of an unfavorable degree of irregularity.

On the other hand, in compact disks and optical disks which have been developed recently, light waves which have been reflected by grooves formed on the surface thereof interfere with each other. Therefore, a specific wavelength is emphasized, which gives the product a different appearance.

Referring to FIG. 3 which is a partial sectional view showing the surface of a disk which provides an interference color, an aluminum film 3 is evaporated onto the upper surface of a transparent substrate 1 having projections 2 formed on the upper surface thereof. Light 4 which has been incident on the lower surface 5 of the transparent substrate 1 is reflected by the aluminum film 3. The disk gives a favorable impression on the eye. This phenomenon is generated because of the interference color. That is, each light having a wavelength equal to the optical path difference between light 6 reflected by the aluminum film 3 not corresponding to the projection 2 and light 6' reflected by the aluminum film 3 corresponding to the projection 2 interferes with each other.

Utilizing this principle, a surface-indented covering member comprising an ornamental transparent film which is to be stuck to a product is commercially available. With to the film, the direction of reflected light is controlled by a devised pattern configuration.

According to the above conventional art, optical path differences are slightly different from each other according to the incident and reflection angle of light. As a result, reflected interference colors form a rainbow. If the wavelengths of interference colors are out of the visible region, aluminum looks as it is. The conventional art has a limitation in giving a favorable color to the product.

SUMMARY OF THE INVENTION

It is therefore the object of the present invention to provide a surface-indented covering member which makes light in an intended wavelength region visible in the form of an interference color so as to give a favorable impression of a product to the eye in combination with the color tone of the material of the product and an additive applied to the product.

In accomplishing these and other objects, according to one aspect of the present invention, there is provided a surface-indented covering member, having a groove on its surface, in which the depth of the groove is in the range from 0.2 to 0.4 microns and the width thereof is not more than the depth thereof and is greater than 0 and not more than 0.4 microns.

According to the aspect of the present invention, since the width of the groove is equal to or less than the depth thereof, the wavelength region of each interference color formed on the surface of the surface-indented covering member can be ranged within ±6% with respect to the average wavelength thereof. Therefore, lights only in an intended wavelength region are visible.

According to another aspect of the present invention, there is provided the surface-indented covering member, having a groove on its surface and a material for covering the surface of the member to bury at least the groove thereunder, in which the depth of the groove is in the range from 0.12 to 0.3 microns and the width thereof is not more than the depth thereof and is greater than 0 and not more than 0.3 microns, the material being transparent and having a refractive index of the material smaller than that of the member.

According to a further aspect of the present invention, since the groove is buried (or covered) by the transparent material, the interference color can be reliably obtained.

BRIEF DESCRIPTION OF THE DRAWINGS

These and other objects and features of the present invention will become apparent from the following description taken in conjunction with the preferred embodiments thereof with reference to the accompanying drawings, in which:

FIG. 3 is a perspective view showing principal portions of a conventional surface-indented covering member.

DETAILED DESCRIPTION OF THE INVENTION

Figure 1:
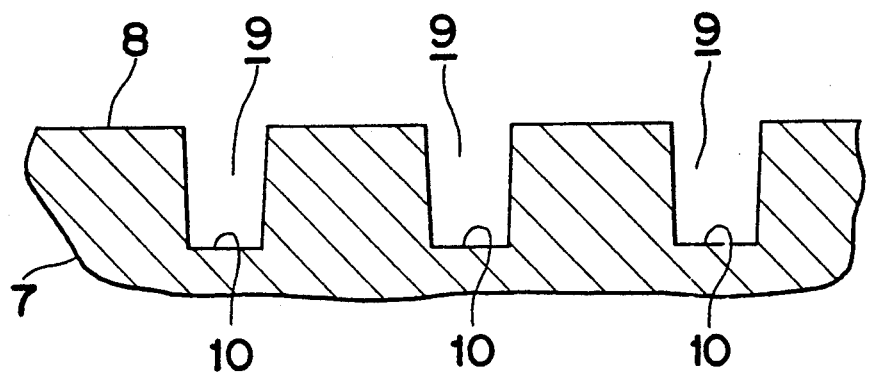
FIG. 1 is a sectional view showing principal portions of a surface-indented covering member according to a first embodiment of the present invention.

Before the description of the present invention proceeds, it is to be noted that like parts are designated by like reference numerals throughout the accompanying drawings.

Referring to FIG. 1 which is a partial sectional view of a surface-indented covering member according to a first embodiment of the present invention, a groove 9 is formed on the surface 8 of a member 7. The color tone of the member 7 is blackish blue. The groove 9 is approximately 0.2 microns in width and 0.22 microns in depth. The pitch between the grooves 9 is 0.5 microns. The roughness degree of the flat surface 8 and the flat bottom surface 10 of the groove 9 is approximately 0.02 microns. The surface of the surface-indented covering member is entirely dark blue, but an interference color in the blue region of 0.44 to 0.46 microns is visible coming up to the bottom surface thereof when the surface-indented covering member is viewed in a direction in which the bottom surface 10 of the groove 9 can be seen.

The groove 9 which is submicrons in width and depth is obtained by photolithography. A replica obtained from the groove 9 can be used as a mold of a producing means for performing an injection resin molding and a compression resin molding or a casting.

The depth of the groove is preferably in the range from 0.2 to 0.4 microns, and the width thereof is preferably not more than the depth thereof and greater than 0 and not more than 0.4 microns.

Figure 2:
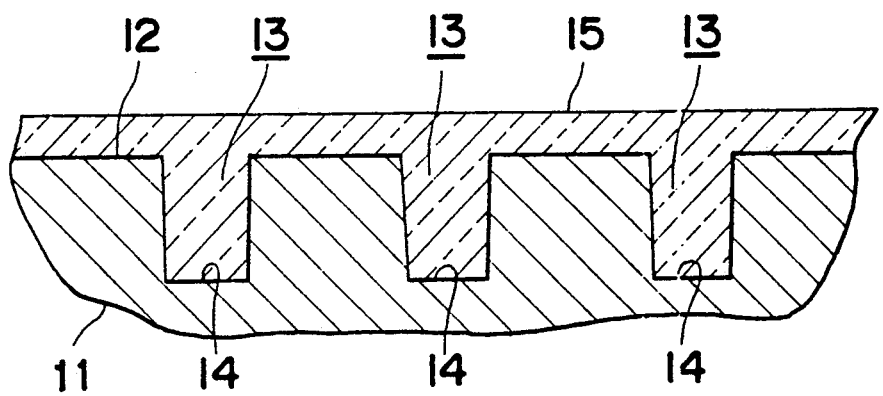
FIG. 2 is a sectional view showing a part of a surface-indented covering member according to a second embodiment of the present invention.
Figure 2:
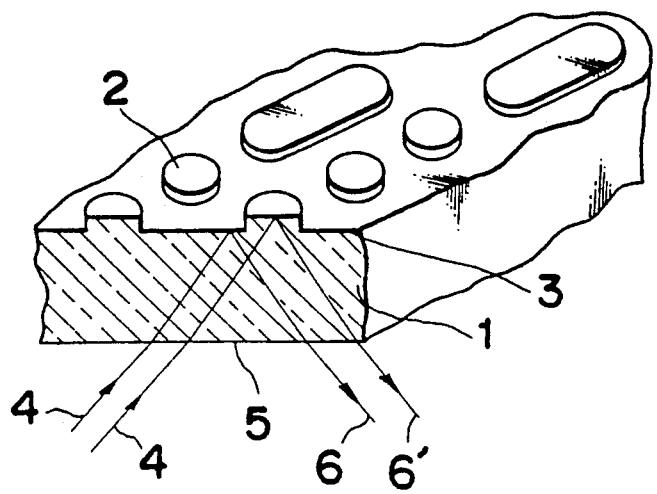

FIG. 2 shows a surface-indented covering member according to a second embodiment of the present invention. A groove 13 formed in the surface 12 of a first member 11 is 0.15 microns in width and 0.16 microns in depth. The pitch between the grooves 13 is 0.5 microns. The surface 12 and the bottom surface 14 of the groove 13 are flat. A transparent coating member 15 (or covering material) (i.e. a second member) coats the surface 12 of the first member 11 so that the coating member 15 completely buries (or covers) the groove 13 thereunder. The member 11 consists of polystyrene resin, the refractive index of which is 1.59, and dark blue pigment mixed with each other. The coating member 15 consists of fluororesin, the refractive index of which is 1.35.

The surface-indented covering member prevents the groove 13 from being covering by materials such as dust, finger marks, fat and oil, water droplets, and the like. Therefore, an interference color can be reliably obtained. Since the refractive indices of the coating members 15 and 11 are different from each other, light which has been incident on the coating member 15 is allowed to be reflected at the boundary between the coating members 15 and 11. The small reflectivity of the coating member 15 is allowed to reflect light which has been incident on the coating member 15 in a small reflectivity.

When the coating member 15 is used, the wavelength of the interference color is calculated as follows:

$$L = (2d)^{(2n)}$$

where L is the wavelength of the interference, d is the depth of the groove 13, and n is the reflectivity of the member 15. Therefore, in order to obtain the interference color of a wavelength of 0.44 to 0.46 microns using the coating member 15, the reflectivity of which is 1.35, it is preferable that the groove 13 is 0.16 microns in depth.

The depth of the groove is preferably is in the range from 0.12 to 0.3 microns, and the width thereof is preferably not more than the depth thereof and greater than 0 and not more than 0.3 microns.

According to the invention, light only in the intended wavelength region is visible in the form of an interference color. Therefore, a product can be viewed in a wide range of color designs. And, the interference color can be reliably obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A covering device comprising a surface-indented covering member with at least one groove formed in its surface, said at least one groove having a depth in a range of 0.2 to 0.4 microns and a width which is not more than said depth.

2. A covering device as recited in claim 1, wherein said at least one groove comprises a plurality of grooves.

3. A covering device comprising:

a surface-indented covering member with at least one groove formed in its surface, said at least one groove having a depth in a range of 0.12 to 0.3 microns and a width which is not more than said depth; and a covering material disposed on the surface of said surface-indented covering member in such a manner as to at least cover said at least one groove, said covering material being transparent and having a refractive index which is smaller than a refractive index of said covering member.

4. A covering device as recited in claim 3, wherein said at least one groove comprises a plurality of grooves.

5. A covering device as recited in claim 3, wherein said covering material covers portions of said surface other than said at least one groove.

* * * * *